US006083009A

United States Patent [19]

Kim et al.

[11] Patent Number: 6,083,009

[45] Date of Patent: Jul. 4, 2000

[54] KARAOKE SERVICE METHOD AND SYSTEM BY TELECOMMUNICATION SYSTEM

[76] Inventors: Ihl-Doo Kim, 781-35, Yoksam-Dong, Kangnam-Ku, Seoul; Sang-Ghil Lee, 111-1004 Keukdong Apt., Doklibmoon, Hyonjeo-Dong, Seodaemoon-Ku, Seoul; Sang-Cheol Han, 1215-1505 Mokdong Apt., 326, Shinjeong-Dong, Yangcheon-Ku, Seoul; Hun-Bum Ha, 110-503 Lucky Songdo Apt., 626, Oklyon-Dong, Yonsoo-Ku, Incheon, all of Rep. of Korea

[21] Appl. No.: 09/154,328

[22] Filed: Sep. 16, 1998

[30] Foreign Application Priority Data

Aug. 17, 1998 [KR] Rep. of Korea .................... 98-33696

[51] Int. Cl.[7] ........................... G09B 15/06; G10H 7/00

[52] U.S. Cl. ............................... 434/307 A; 434/307 R; 455/4.2; 84/609

[58] Field of Search .............................. 434/307 R–309, 434/318, 365; 84/477 R, 601–611, 615, 675, 630, 631, 645; 455/4.2, 5.1, 6.3, 15, 515; 379/93.05, 93.14, 93.17; 370/85.5, 95.1, 95.2, 432, 535; 369/22, 34, 48, 50, 83, 178, 192; 360/1.9, 32, 33.01, 49, 69, 70, 77.01, 98.04; 381/81; 386/55, 97, 105; 709/219; 348/7, 17, 448, 552, 571, 678; 345/141, 143, 147

[56] References Cited

U.S. PATENT DOCUMENTS

| | | | |
|---|---|---|---|
| 5,532,923 | 7/1996 | Sone . | |
| 5,588,842 | 12/1996 | Nishimura et al. | 434/307 A |
| 5,613,192 | 3/1997 | Ikami et al. | 455/4.2 |
| 5,619,425 | 4/1997 | Funahashi et al. | 709/219 |
| 5,684,261 | 11/1997 | Luo | 84/609 |
| 5,689,081 | 11/1997 | Tsurumi | 84/609 |
| 5,691,494 | 11/1997 | Sai et al. | 84/609 |
| 5,725,383 | 3/1998 | Funahashi et al. | 434/307 A |
| 5,768,396 | 6/1998 | Sone | 381/61 |
| 5,833,469 | 11/1998 | Ito et al. | 434/307 A |
| 5,890,910 | 4/1999 | Tsurumi et al. | 434/307 A |
| 5,899,699 | 5/1999 | Kamiya | 434/307 A |
| 5,900,564 | 5/1999 | Kurakake | 84/477 R |
| 5,911,582 | 6/1999 | Redford et al. | 434/307 R |
| 5,931,679 | 8/1999 | Funahashi | 434/307 A |
| 5,957,696 | 9/1999 | Kageyama | 434/307 A |
| 5,980,261 | 12/1996 | Mino et al. | 434/307 A |

FOREIGN PATENT DOCUMENTS 7-202816 8/1995 Japan .

*Primary Examiner*—Joe H. Cheng

*Attorney, Agent, or Firm*—Lahive & Cockfield, LLP

[57] ABSTRACT

A karaoke service method by telecommunication system downloads karaoke data through a portable karaoke device and provides a karaoke service by using a radio data transmitting and receiving function of a mobile telephone network and a system thereof. In the method, it is judged whether a stored music executing mode or a new music down load mode is selected. A karaoke service server is connected to a public switched data network when the new music down load mode is selected. A file down load with respect to a selected music is requested. A file of a corresponding music selected is downloaded. According to the method, the karaoke device is connected to a karaoke service server having a simple communication protocol system and performs music files and a basic communication function and the karaoke service server reads music file information out of the data network and transmits the read music file information to the karaoke device. Accordingly, a small and inexpensive karaoke device can be realized.

10 Claims, 4 Drawing Sheets

KARAOKE SERVICE METHOD AND SYSTEM BY TELECOMMUNICATION SYSTEM

BACKGROUND OF THE INVENTION

1. Field of the Invention

The present invention relates to a karaoke service method and system by a telecommunication system, more particularly, to a karaoke service method by telecommunication system which downloads karaoke data through a portable karaoke device and provides a karaoke service by using a radio data transmitting and receiving function of a mobile telephone network and a system thereof.

2. Prior Art

Generally, a karaoke device is a device which reproduces sound of a musical instrument in order to help and accompany vocalists. Advancements in electronic industry, provided a device which electronically process sound to replace a physical accompaniment of a musical band or group. Such a device mixes a wave of a sound source and digitalizes element of sound such as accompaniment instruments free of voice. Karaoke device enhances the stage and helps the singer by displaying a background image and music lyrics on a television monitor along with a musical sound. The karaoke device includes a memory which stores data corresponding to a selection of songs. When a user wants to add new songs, a memory which stores a new selection of songs must be added.

A karaoke device out in the fields includes a portable device storing a selection of songs is connected to a TV receiver or an amplifier. However, since such portable device is unable to add newly released songs a selection of new songs must be stored on another portable device taking place of an old portable device. Currently, a development of wire data communication through the internet makes it possible to selectively download an accompaniment musical data and voice of singers which are digitalized through a computer in which a music card is mounted. More particularly, since acquirement of musical data through such medium can be converted to various kinds of musical data formats as occasion demands, a user is able to process the data compatible with a karaoke device.

However, karaoke devices should utilizing a computer or a notebook computer needs a music card function. Currently, a portable device which converts a music file downloaded through a cable into a compressed music file by a computer has been developed and popularized. However, due to the amount of data that the portable device have to process is large, the portable device needs a considerable memory capacity. Accordingly, increasing its cost. Recent developments in transmission enables a user to connect a mobile station and a notebook computer to a data network out in the fields, for downloading various musical data.

U.S. Pat. No. 5,532,923 (issued to Takurou Sone on Jul. 2, 1996) discloses a karaoke network system composed of a central station for serving a song data, and local stations each connected to the central station through a communication line for presenting a karaoke event in response to a request according to the served song data.

FIG. 1 shows a conventional karaoke service system by a mobile telephone system. When a user of a mobile station (MS) 106*a* tries to call a wire telephone subscriber, MS 106*a* is connected to a base station 106*b* on the radio. A calling signal transmitted or received through an antenna 106*e* of the mobile station 106*a* and an antenna 106*f* of a base station 106*b* is connected to a mobile switching center (MSC) 106*d* through a base station 106*b* and a base station controller 106*c* by wire. And the calling signal is transmitted to a public switched telephone network 110 through MSC 106*d* so that the user of the mobile station (MS) 106*a* calls a wire telephone subscriber.

On the other hand, in order to receive a radio data service through a mobile telephone network 106, a data network interworking function 104, mounted between a public switched data network 108 and MSC 106*d*, provides a data path between the public switched data network 108 and MSC 106*d*. In the conventional karaoke service system, a notebook computer 102 is connected to the mobile telephone network 106 through the mobile station 106*a*. The MSC 106*d* and BSC 106*c* are connected to PSDN 108 through an IWF 104. As previously described, when the connection between the mobile station 106*a* and PSDN 108 is completed and a data path is set, the user searches a web site of PSDN 108 which provides karaoke data and downloads selected musics and stores it in the notebook computer 102. Accordingly, the notebook computer 102 can execute song accompaniments upon completion of the downloading operation.

However, according the conventional karaoke service system, a user downloads music files through a mobile station and a notebook computer and listens musics of the downloaded music files. In order to listen song accompaniment out in the fields, a user always need to take the notebook computer. In the conventional portable karaoke system free of a new music adding function, data with respect to new musics cannot be added. Moreover, in the conventional karaoke service system, in order to acquire karaoke data from the radio transmission, an expensive notebook computer as well as a mobile station is needed, making the system uneconomical for consumers.

SUMMARY OF THE INVENTION

Therefore, it is an object of the present invention, for the purpose of solving the above mentioned problems, to provide a karaoke service method by telecommunication system wherein a mobile telephone terminal downloads karaoke data through a portable karaoke device and provides a karaoke service by using a radio data transmitting and receiving function of a mobile telephone network and a system thereof.

In order to attain the object, according to the present invention, there is provided a karaoke service method by a telecommunication system, the method comprising the steps of:

(a) judging whether a stored music executing mode or a new music down load mode is selected;

(b) connecting a karaoke service server to a public switched data network when the new music down load mode is selected in step (a);

(c) requesting a file down load with respect to a selected music; and (d) downloading a file of a corresponding music selected in step (c).

The step (d) preferably includes: (d-1) downloading the corresponding music file from the karaoke service server to a karaoke device responsive to a signal corresponding to a request of the corresponding music file down load; (d-2) judging whether the downloading of the corresponding music file of step (d-1) is completed; and (d-3) in step (d-2), when the downloading of the corresponding music file is not completed, executing step (c), and when the downloading of the corresponding music file is completed, executing step (a).

Also, there is provided a karaoke service system by a telecommunication system, the system comprising:

a karaoke device connected to a mobile station for selectively generating a stored file executing mode signal or a new music down load mode signal in order to select a stored file executing mode signal or a new music down load mode, respectively, for playing a stored music when the stored file executing mode is selected and for requesting a down load with respect to a selected music file when the new music down load mode is selected;

a karaoke service server for reading the selected music file from a public switched data network responsive to the request of the downloading and downloading the read music file to the karaoke device; and a data network interworking function for connecting the karaoke device to the karaoke service server through a mobile telephone network responsive to the new music down load mode signal generated by the karaoke device.

The karaoke device preferably includes: a memory for storing karaoke data having sound and lyrics data; a key input section for generating a stored file executing mode signal or a new music down load mode signal and for generating a signal indicative of a download request with respect to a selected music; an audio outputting section for mixing and outputting the sound data stored in the memory and a voice generated by a microphone; a caption generator for converting the words data stored in the memory into a caption; an image synthesizer for synthesizing the caption from the caption generator and a background image signal; a liquid crystal display for displaying an output signal of the image synthesizer; and a controller for judging whether a stored file executing mode or a new music down load mode is selected, for playing stored music when the stored file executing mode is selected and connecting the karaoke device to the karaoke service server when a new music down load mode is selected.

According to the present invention, the karaoke device is not directly connected to a data network such as a PSTN or an internet but is connected to a karaoke service server having a simple communication protocol system and performs accompaniment of music files and a basic communication function. And the karaoke service server reads music file information out of the data network and transmits the read music file information to the karaoke device. Accordingly, a small and inexpensive karaoke device can be realized. The karaoke service system according to the present invention converts music files into sound while downloading the music files through a mobile station. The karaoke service system can display lyrics on an LCD while executing song accompaniment.

Other objects and further features of the present invention will become apparent from the detailed description when read in conjunction with the attached drawings.

BRIEF DESCRIPTION OF THE DRAWINGS

Other features and advantages of the present invention will become more apparent from the following description taken in connection with the accompanying drawings, wherein.

DETAILED DESCRIPTION OF THE PREFERRED EMBODIMENT

Figure 1:
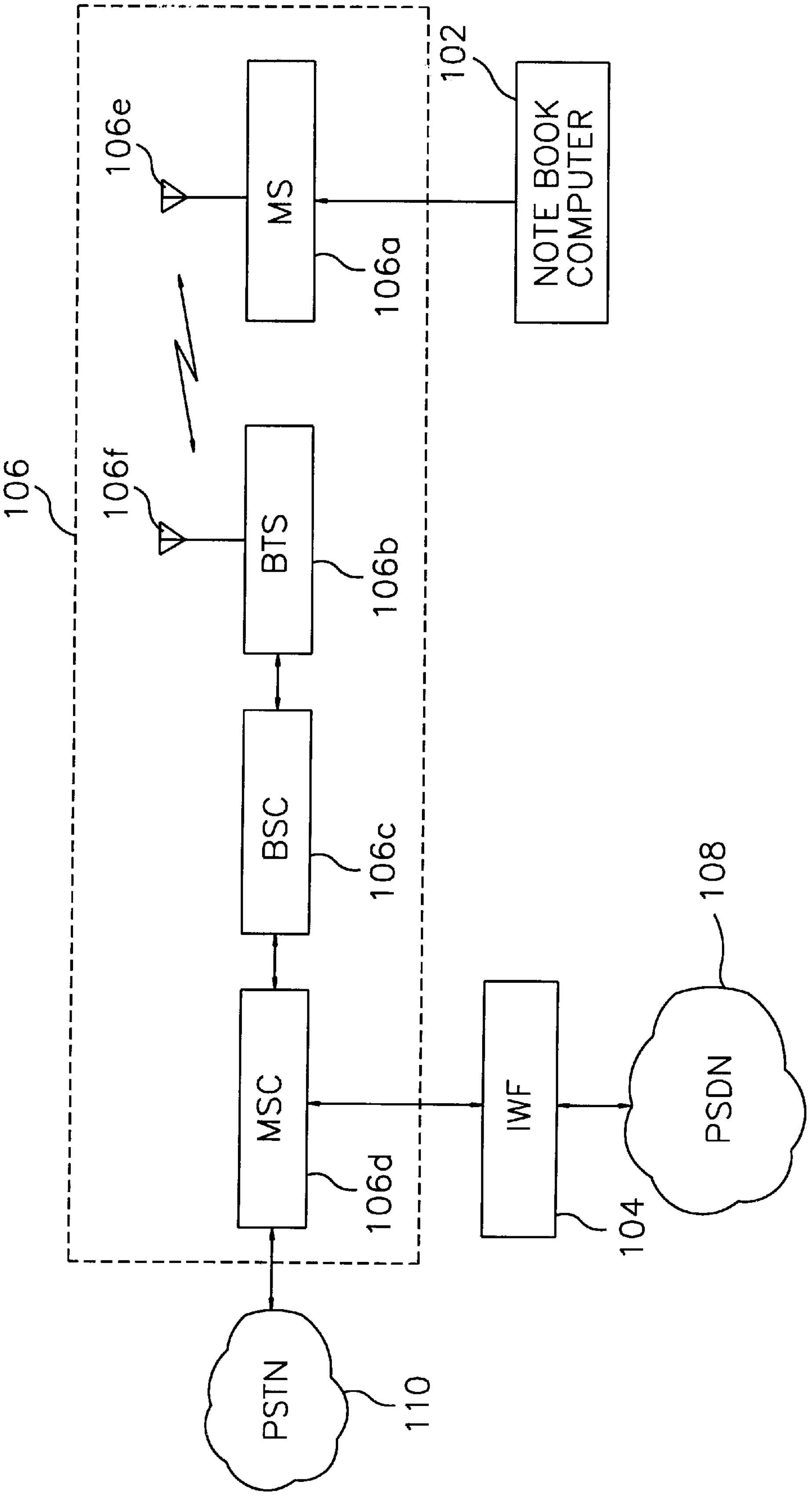
FIG. 1 PRIOR ART
FIG. 1 is a block diagram for showing a conventional karaoke service system by a mobile telephone system.
Figure 2:
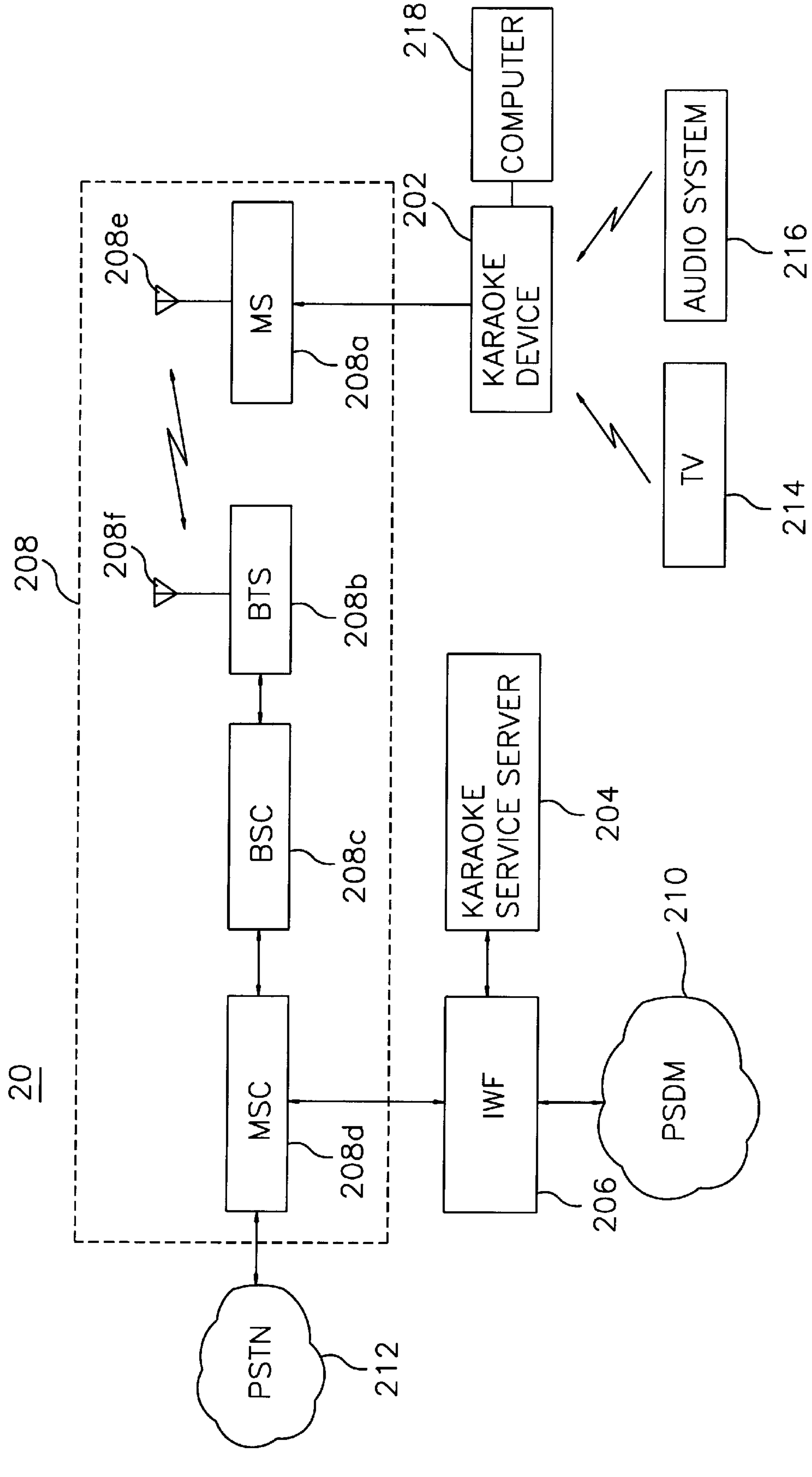
FIG. 2 is a block diagram for showing a configuration of a karaoke service system by a telecommunication system according to a preferred embodiment of the present invention.

The preferred embodiment of the present invention will hereinafter be described in detail with reference to the accompanying drawings. FIG. 2 shows a configuration of a karaoke service system 20 by a telecommunication system according to a preferred embodiment of the present invention. The karaoke service system 20 includes a karaoke device 202, a karaoke service server 204, and a data network interworking function 206.

The karaoke device 202 is connected to a mobile station (MS) 208*a* and selectively generates a stored file executing mode signal or a new music down load mode signal in order to select a stored file executing mode or a new music down load mode. The karaoke device 202 plays a corresponding stored music when the stored file executing mode is selected and requests a down load of selected music file when a new music down load mode is selected.

Figure 3:
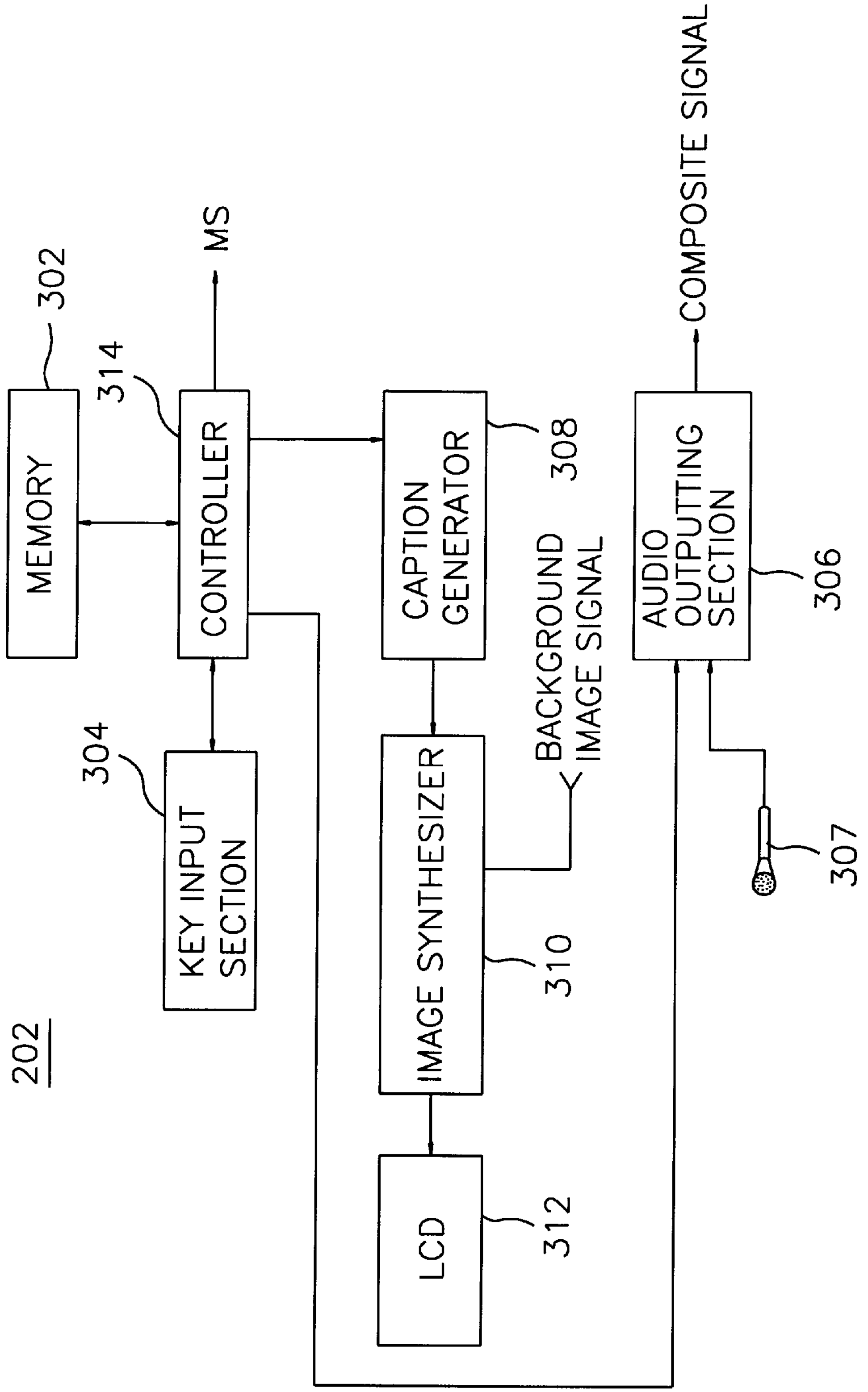
FIG. 3 is a block diagram for showing one example of the karaoke device shown in FIG. 2.

FIG. 3 is a block diagram for showing one example of the karaoke device shown in FIG. 2. The karaoke device includes a memory 302, a key input section 304, an audio outputting section 306, a caption generator 308, an image synthesizer 310, a liquid crystal display (LCD) 312, and a controller 314.

The memory 302 stores karaoke data having sound and words data. The key input section 304 generates the stored file executing mode signal or the new music down load mode signal and for generating a signal indicating the download request with respect to a selected music. The audio outputting section 306 mixes and outputs the sound data stored in the memory 304 and a voice generated by a microphone 307. The caption generator 308 converts the words data stored in the memory 304 into a caption. The image synthesizer 310 synthesizes the caption from the caption generator 308 and a background image signal. The LCD 312 displays an output signal of the image synthesizer 310. The controller 314 judges whether a stored file executing mode or a new music down load mode is selected, plays a corresponding stored music when the stored file executing mode is selected, and connects the karaoke device to the karaoke service server 204 when the new music down load mode is selected.

The karaoke device 202 downloads data having song accompaniment. The karaoke device 202 also functions to convert stored music file into sound. The karaoke device 202 includes an external output terminal and a TV receiver 214 connected to the karaoke device 202 through the external output terminal and displays words of accompaniment music on a screen. An audio system 216 is connected to the karaoke device 202 through the external output terminal and plays the accompaniment music. The karaoke device 202 also includes a computer matching connector and transmits data with a computer 218 through the computer matching connector. The karaoke device 202 can be mounted on a mobile station 208*a* or a household electric appliance such as a TV receiver 214 or an audio system 216.

The karaoke service server 204 reads a corresponding music file from a PSDN 210 responsive to the request of the downloading with respect to the selected music file and downloads the read music file to the karaoke device 202. The data network interworking function 206 connects the karaoke device 202 to the karaoke service server through a mobile telephone network 208 responsive to the new music down load mode signal generated by the karaoke device 202. The PSDN 210 and karaoke service server 204 provide an additional radio data service to the karaoke device 202 by using a standard data communication protocol such as a TCP/IP.

A communication protocol between the karaoke device 202 and karaoke service server 204 can be set and modified to recognize each other. The mobile station 208*a*, a base station 208*b*, a base station controller 208*c*, and a mobile switching center (MSC) 208*d* constitutes a mobile telephone network 208. Reference numerals 208*e* and 208*f* notes an antenna of the mobile station 208*a* and an antenna of the base station 208*b*.

Figure 4:
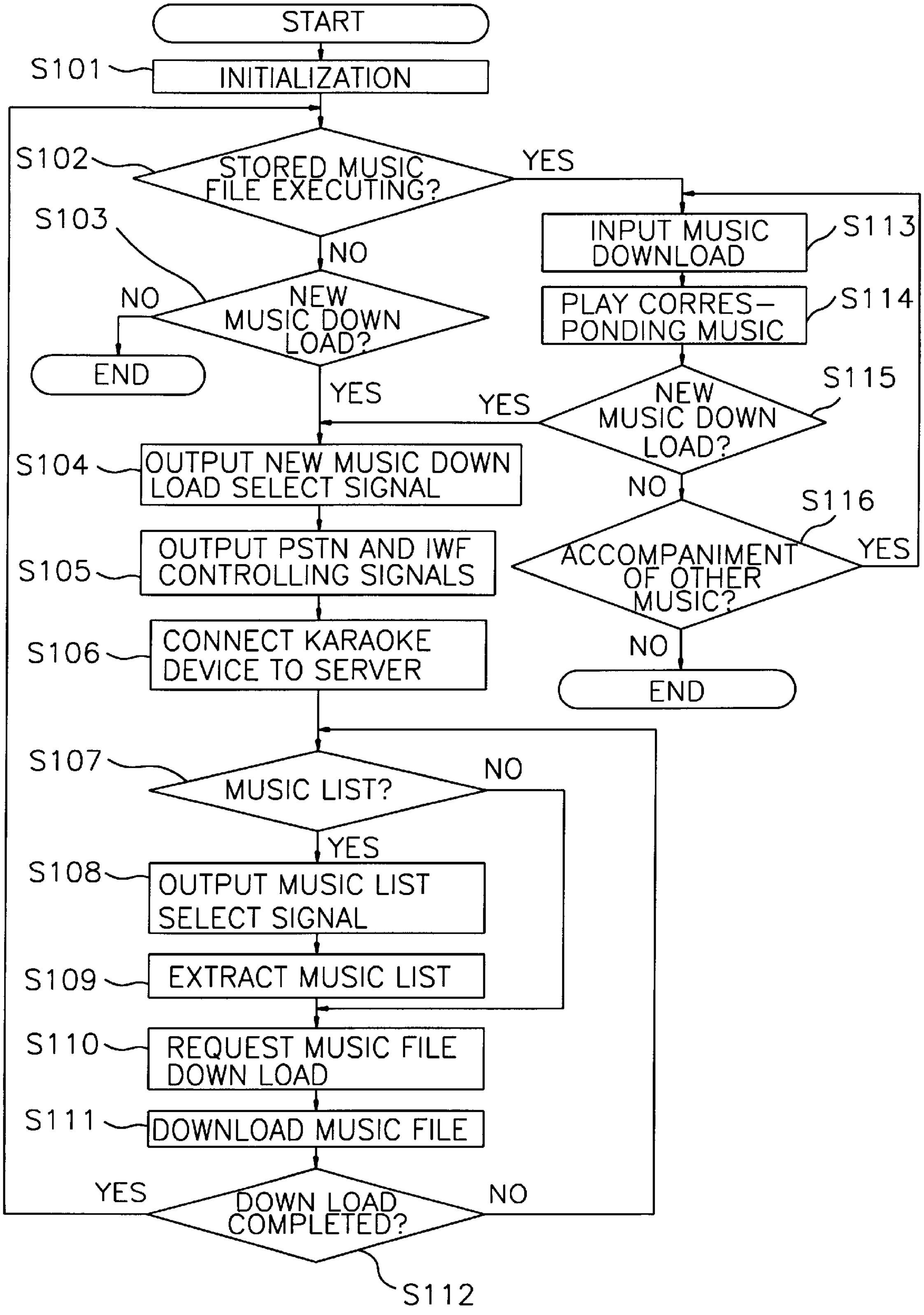
FIG. 4 is a flow chart for illustrating a karaoke service method by a telecommunication system according to a preferred embodiment of the present invention.

Hereinafter, an operation of the karaoke service system 20 and the karaoke service method by a telecommunication system according to a preferred embodiment of the present invention will be described in detail. FIG. 4 illustrates a karaoke service method by a telecommunication system according to a preferred embodiment of the present invention. In step S101, a user presses a power button of a key input section 304, to initialize the system. In step S102, the controller 314 of the karaoke device 202 judges whether or not a stored music executing mode is selected. According to a result of the judgement in step S102, when the stored music executing mode is not selected, the controller 314 judges whether or not a new music down load mode is selected (step S103).

According to a result of the judgement in step S103, when the new music down load mode is not selected, total operation comes to an end. When it judged that the new music down load mode is selected, the controller 314 outputs a new music down load select signal (step S104). The new music down load select signal is applied to a mobile switching center (MSC) 208*d* through MS 208*a*, a base station (BTS) 208*b*, and a base station controller (BSC) 208*c* of the mobile telephone network 208. MSC 208*d* outputs a PSTN control signal and a data network interworking function control signal to a public switched telephone network (PSTN) 212 and a data network interworking function (IWF) 206, respectively (step S105).

PSTN 212 does not connect with the MS 208*d* in response to the PSTN control signal from the MSC 208*d*. The IWF 206 operates in response to the data network interworking function control signal from the MSC 208*d* and controls an operation of the karaoke service server 204. Accordingly, the karaoke device 202 is connected to the karaoke service server 204 through a mobile telephone network 208 and IWF 206 (step S106). Then, the controller 314 judges whether or not a user requests a music list (step S107). According to a result of the judgement in step S107, when the user requests a music list, the karaoke device 202 applies a music list select signal to the karaoke service server 204 through the mobile telephone network 208 and IWF 206. Accordingly, the karaoke service server 204 is connected to PSDN 210 through IWF 206 and extracts a music list from a web site or an information provider having karaoke data and transmits the music list to the karaoke device 202(step S109).

When the user requests a file down load a selected music on the music list by using the karaoke device 202 or when the user requests a file down load of a selected music when the user does not request the music list in step S107, the karaoke device 202 outputs a signal indicative of the request of the corresponding music file down load to the karaoke service server 204 through the mobile telephone network 208 and IWF 206(step S110). The karaoke service server 204 downloads a corresponding music file to the controller 314 of the karaoke device 202 through the IWF 206 and mobile telephone network 208 in response to the signal indicative of the request of the corresponding music file down load. The downloaded music file is stored in an empty area of the memory 302 which is not written or in a memory left vacant after erasing unnecessary karaoke data. The controller 314 judges whether or not a music file down load is completed (step S112). According to a result of the judgement in step S112, when the music file down load has not been completed, the routine returns step S117. When it is judged that the music file down load has been completed, the routine returns to step S102.

On the other hand, according to the result of judgement in step S102, when the stored music executing mode is selected, the user presses a music number input button to input a music number or inputs a desirable music name by means of a voice when a voice recognition chip is mounted on the system (step S113). Accordingly, the karaoke device 202 executes a corresponding accompaniment of the selected music inputted by the user (step S114). That is, the controller 314 processes karaoke data having sound and words data which are stored in the memory 302 and feeds the sound and words data to an audio outputting section 306 and a caption generator 308, respectively. Accordingly, the audio outputting section 306 mixes and outputs the sound data processed by the controller 314 and a voice generated by a microphone 307. On the other hand, the caption generator 308 converts the words data processed by the controller 314 into a caption and provides the caption to the image'synthesizer 310. The image synthesizer 310 synthesizes the caption from the caption generator 308 and a background image signal. The LCD 312 displays an output signal of the image synthesizer 310 so that the user can sing with the help of a caption displayed on a background screen of the LCD 312.

Then the controller 314 judges whether or not a new music down load mode is selected while executing the accompaniment of a corresponding music (step S115). When the new music down load mode while executing the accompaniment of a corresponding music is selected, step S104 is executed. When it is judged that the new music down load mode while executing the accompaniment of a corresponding music is not selected, the controller 314 judges whether or not the user selects accompaniment of other music (step S116). As a result of the judgement in step S116, when the user did not select accompaniment of other music, a total operation comes to an end. When it judged that the user selected accompaniment of other music, the routine returns to step S113.

On the other hand, the user wants a general calling, a base station 208*a* generates a calling message by the operation of the user, the generated calling message is transmitted to the PSTN through the mobile telephone network 208 so that the calling is achieved.

As mentioned above, the karaoke device is not directly connected to a data network such as a PSTN or an internet but is connected to a karaoke service server having a simple communication protocol system and performs accompaniment of music files and a basic communication function. And the karaoke service server reads music file information out of the data network and transmits the read music file information to the karaoke device. Accordingly, a small and inexpensive karaoke device can be realized. The karaoke service system according to the present invention converts music files into sound while downloading the music files through a mobile station. The karaoke service system can display lyrics on an LCD while executing song accompaniment. Also, when the karaoke service system is connected to an external TV monitor, it can display the lyrics through the TV monitor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A karaoke service method by a telecommunication system, said method comprising the steps of:

(a) judging whether a stored music executing mode or a new music down load mode is selected;

(b) connecting a karaoke service server to a public switched data network when the new music down load mode is selected in step (a);

(c) requesting a file down load with respect to a selected music; and (d) downloading a file of a corresponding music selected in step (c).

2. The method as claimed in claim 1, wherein step (b) includes:

(b-1) outputting a new music down load select signal;

(b-2) outputting a data network interworking function controlling signal responsive to the new music down load select signal outputted in step (b-1); and (b-3) connecting to the karaoke service server responsive to the data network interworking function controlling signal outputted in step (b-2).

3. The method as claimed in claim 1, wherein step (d) includes:

(d-1) downloading the corresponding music file from the karaoke service server to a karaoke device responsive to a signal corresponding to a request of the corresponding music file down load;

(d-2) judging whether the downloading of the corresponding music file of step (d-1) is completed; and (d-3) in step (d-2), when the downloading of the corresponding music file is not completed, executing step (c), and when the downloading of the corresponding music file is completed, executing step (a).

4. The method as claimed in claim 1, further comprising the steps of:

(a-1) inputting a number corresponding to a selected music; and (a-2) playing the selected music corresponding to the music number inputted in step (a-1), when the stored music executing mode is selected in step (a).

5. The method as claimed in claim 1, further comprising the steps of:

(b-1) judging whether a music list is requested to the public switched data network and obtaining the music list according to the judgement result.

6. The method as claimed in claim 5, wherein step (b-1) includes:

(b-1-1) judging whether the music list is requested;

(b-1-2) outputting a music list select signal to the karaoke service server through a mobile telephone network and a data network interworking function when the music list is requested;

(b-1-3) connecting the karaoke service server to the public switched data network and obtaining a music list therefrom responsive to the music list select signal, between steps (b) and (c).

7. A karaoke service method by a telecommunication system, said method comprising the steps of:

(i) judging whether a stored music executing mode or a new music down load mode is selected;

(ii) playing a selected music when the stored music executing mode is selected, and connecting a karaoke service server to a public switched data network when the new music down load mode is selected, in step (i);

(iii) judging whether a music list is requested to a public switched data network and obtaining the music list from the public switched data network;

(iv) requesting a file down load with respect to the selected music;

(v) downloading a file of the selected music requested in step (iv); and (vi) executing step (iv) when the music file downloading operation has not been completed, and executing step (i) when the music file downloading operation has been completed.

8. A karaoke service system by a telecommunication system, said system comprising:

a karaoke device connected to a mobile station for selectively generating a stored file executing mode signal or a new music down load mode signal in order to select a stored file executing mode signal or a new music down load mode, respectively, for playing a stored music when the stored file executing mode is selected and for requesting a down load with respect to a selected music file when the new music down load mode is selected;

a karaoke service server for reading the selected music file from a public switched data network responsive to the request of the downloading and downloading the read music file to the karaoke device; and a data network interworking function for connecting the karaoke device to the karaoke service server through a mobile telephone network responsive to the new music down load mode signal generated by the karaoke device.

9. The system as claimed in claim 8, wherein the karaoke device generates a music list request signal and the karaoke service server extracts a music list from karaoke data from the public switched data network responsive the music list request signal generated by the karaoke device and transmits the extracted music list to the karaoke device.

10. The system as claimed in claim 8, wherein the karaoke device includes:

a memory for storing karaoke data having sound and lyrics data;

a key input section for generating a stored file executing mode signal or a new music down load mode signal and for generating a signal indicative of a download request with respect to a selected music;

an audio outputting section for mixing and outputting the sound data stored in the memory and a voice generated by a microphone;

a caption generator for converting the words data stored in the memory into a caption;

an image synthesizer for synthesizing the caption from the caption generator and a background image signal;

a liquid crystal display for displaying an output signal of the image synthesizer; and a controller for judging whether a stored file executing mode or a new music down load mode is selected, for playing stored music when the stored file executing mode is selected and connecting the karaoke device to the karaoke service server when a new music down load mode is selected.

* * * * *

UNITED STATES PATENT AND TRADEMARK OFFICE

CERTIFICATE OF CORRECTION

PATENT NO. : 6,083,009

DATED : July 4, 2000

INVENTOR(S) : Ihl-Doo Kim, et al.

It is certified that error appears in the above-identified patent and that said Letters Patent is hereby corrected as shown below:

Title page ., please insert --[73] Assignee: Shinsegi Telecomm, Inc., Seoul, Korea--.

Column 6, Line 34, replace "image' synthesizer" with -- image synthesizer--.

Column 8, Line 50, begin new paragraph after "and" and before "a data network".

Signed and Sealed this

Twenty-second Day of May, 2001

Attest:

Nicholas P. Godici

NICHOLAS P. GODICI

*Attesting Officer* *Acting Director of the United States Patent and Trademark Office*